(Model.)
G. BANISTER.
FORK.
No. 259,078. Patented June 6, 1882.
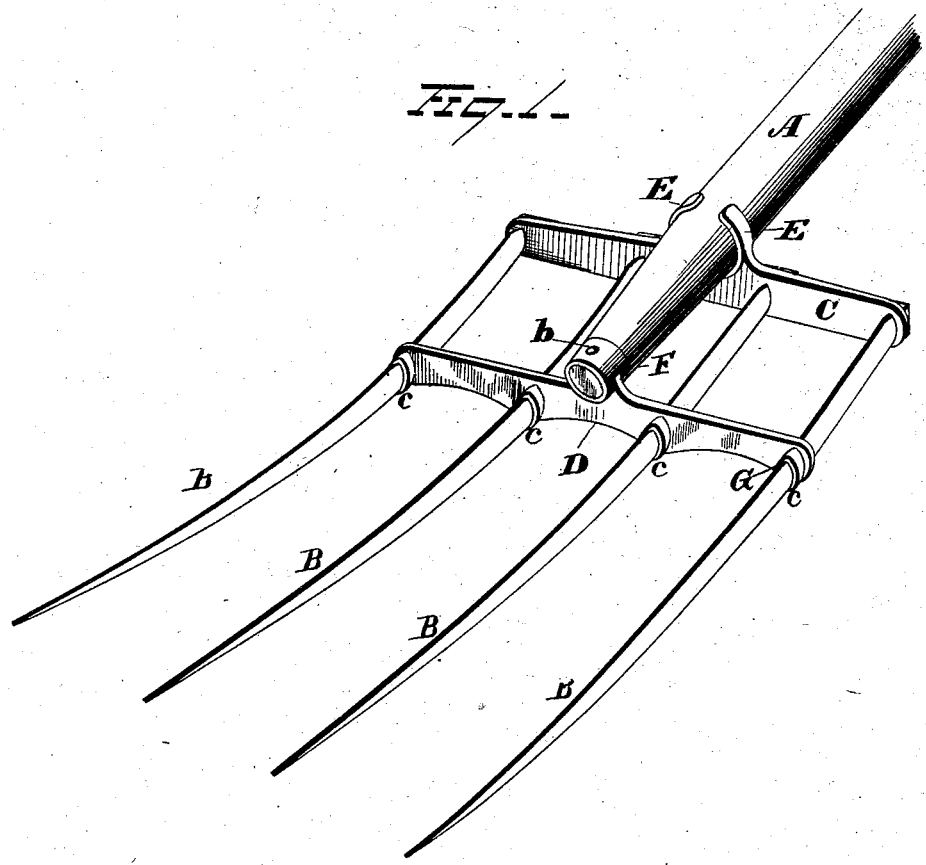
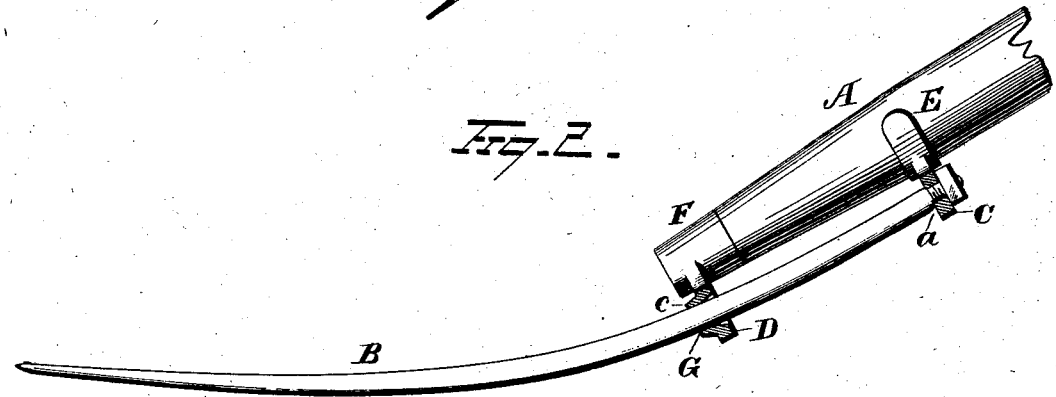
WITNESSES
E. J. Nottingham
Herman Moran
INVENTOR
Geo. Banister,
By Leggett & Leggett
Attorneys

UNITED STATES PATENT OFFICE.

GEORGE BANISTER, OF BARRE, VERMONT, ASSIGNOR OF ONE-HALF TO THE STAFFORD & HOLDEN MANUFACTURING COMPANY, OF SAME PLACE.

FORK.

SPECIFICATION forming part of Letters Patent No. 259,078, dated June 6, 1882.

Application filed March 29, 1882. (Model.)

*To all whom it may concern:*

Be it known that I, GEORGE BANISTER, of Barre, in the county of Washington and State of Vermont, have invented certain new and useful Improvements in Grain-Forks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improvement in forks for handling grain, straw, &c., the object of the same being to provide a fork that will be strong, durable, and light in structure and of comparatively small initial cost; and with these ends in view my invention consists in certain details of construction and combinations of parts, as will be more fully described, and pointed out in the claims.

In the accompanying drawings, Figure 1 is a perspective view of my improved fork; and Fig. 2 is a longitudinal sectional view of the same, taken through one tine of the fork.

A represents an ordinary wooden handle; B, the steel tines; C, the head, and D the cross-bar. The head C is constructed of metal, and preferably of malleable iron, and is provided centrally on its upper edge with the two curved arms E, formed integral therewith, and adapted to partly embrace the handle A at a point back of the extreme outer end thereof and hold the head in position. After the head C is placed on the handle the arms E can be brought into close contact with the handle in any desired manner. This head C is perforated at suitable distances apart and provided with female screw-threads, by means of which the rear ends of the tines B are secured thereto. The rear or shank ends of these tines are screw-threaded, and are adapted to be secured into the perforations before referred to, which securely hold the rear ends of the tines against displacement. Instead of screwing the tines into the head of the fork, as shown in the drawings, the shanks can be smooth throughout the greater portion of their length and screw-threaded on their extreme ends, onto which nuts are secured, which latter, together with the shoulders $a$, answer all the necessary purposes. The steel tines B are bent in the usual form, are preferably made oval in cross-section, and are strengthened and are held in their proper relative positions by the cross-bar D. This bar is also preferably made of malleable iron, is of substantially the same shape as the head, and is provided centrally on its upper edge with the elongated tapering ferrule or socket F, into which the lower extremity of the handle A is placed and secured by the pin or screw $b$. The cross-bar D is also provided with apertures or perforations G, formed at suitable distances apart therein, so as to register with the apertures in the head C. These apertures G are formed by punching or by any suitable method, by means of which the flanges $c$ on the front face thereof will be formed in the same operation therewith. These apertures or perforations are, when formed, sufficiently large to admit of the tines being freely adjusted and placed in their proper positions, and when everything is in readiness the flanges $c$ are, by swaging or otherwise, caused to firmly embrace the tines B and hold them securely therein, not allowing them to turn or twist or move in the direction of their length. The head and cross pieces have heretofore been made of wood; but my device possesses advantages over them in that it is stronger, more durable, and is not so liable to become distorted in shape after exposure.

It is evident that slight changes in the construction of the different parts might be resorted to without departing from the spirit of my invention; and hence I would have it understood that I do not limit myself to the exact construction of parts shown and described, but consider myself at liberty to make such changes as come within the spirit and scope of my invention.

Having fully described my invention, what I claim as new, and desire to secure by Letters Patent, is—

1. In a grain and hay fork, the combination, with a handle, head, and tines, of a cross-bar provided with a ferrule or socket for the reception of the end of the handle and openings for the passage of the tines.

2. In a grain or hay fork, the combination, with a handle, head, and tines, of a metallic cross-bar provided with a ferrule formed integral therewith for the reception of the end of the handle, and a pin or screw for securing the said handle therein, the said cross-bar being perforated at suitable intervals apart for the passage of the tines.

3. In a grain or hay fork, the combination with the handle, head, and tines, of a metallic cross-bar having a socket or ferrule formed integral therewith for the reception of the end of the handle, the said cross-bar being provided with openings for the tines, and flanges formed around said openings, as described, and adapted to closely embrace the tines and hold them in position, substantially as described.

4. In a grain or hay fork, the combination, with the handle, tines, and cross-bar, of the head provided with curved arms adapted to embrace the handle and hold the same in position.

5. In a grain or hay fork, the combination, with the handle, tines, and cross-bar, of a malleable-iron head provided on its upper edge with curved arms adapted to embrace the handle, the said head being perforated for the reception of the shank ends of the tines, substantially as described.

6. In a grain or hay fork, the combination, with the handle, cross-bar, and tines, of a metallic head provided on its upper edge with two curved arms adapted to closely embrace the handle and hold the head in position, and with screw-threaded apertures into which the screw-threaded ends of the tines are secured, all of the above parts constructed substantially as described.

In testimony that I claim the foregoing I have hereunto set my hand.

GEORGE BANISTER.

Witnesses:
CLARK HOLDEN,
NAT. WHITTIER.